United States Patent [19] [11] 3,708,846
Wörner [45] Jan. 9, 1973

[54] METHOD FOR FASTENING THE BLADES OF A ROTOR FOR HYDRODYNAMIC UNITS

[75] Inventor: Otto Wörner, Reutlingen, Germany

[73] Assignee: Daimler-Benz Aktiengesellschaft, Stuttgart-Unterturkheim, Germany

[22] Filed: May 7, 1970

[21] Appl. No.: 35,512

[30] Foreign Application Priority Data

May 10, 1969 Germany.................P 19 23 953.3

[52] U.S. Cl.......29/156.8 CF, 29/156.8 R, 29/471.1, 29/501
[51] Int. Cl.......B21k 3/04, B23p 15/02, B23p 15/04
[58] Field of Search.......29/471.1, 501, 471.3, 472.1, 29/156.8 R, 156.8 CF, 500

[56] References Cited

UNITED STATES PATENTS

| | | |
|---|---|---|
| 1,470,507 | 10/1923 | Steenstrup...........................29/501 X |
| 1,641,745 | 9/1927 | Dimberg...........................29/156.8 R |
| 2,166,998 | 7/1939 | Morgan...............................29/501 X |
| 2,390,789 | 12/1945 | Haskell...............................29/501 X |
| 3,088,192 | 5/1963 | Turner...................................29/501 |
| 3,140,538 | 7/1964 | Rutledge.............................29/501 X |

Primary Examiner—Robert D. Baldwin
Assistant Examiner—Richard Bernard Lazarus
Attorney—Craig and Antonelli

[57] ABSTRACT

A method for fixing the blades of a rotor for a hydrodynamic unit in which the blades are assembled and preliminarily held in position within the shell of the rotor and wires made of soldering or brazing material and bent into the shape of rings are placed on the blades at their places of abutment at the shell housing; after the assembly of the parts as described, the rotor unit is heated above the melting point of the soldering or brazing material and thereafter cooled whereby the soldering or brazing material flows by gravity into the gaps between the blades and the shell.

4 Claims, 1 Drawing Figure

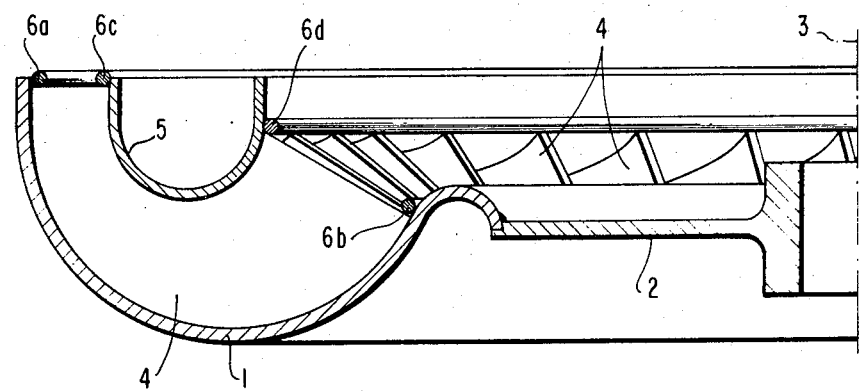

METHOD FOR FASTENING THE BLADES OF A ROTOR FOR HYDRODYNAMIC UNITS

The present invention relates to a method for fixing by soldering or brazing the blades of a rotor for hydrodynamic units, such as hydrodynamic torque converters or hydrodynamic couplings.

A method of this type is known in the prior art in which one or several small rods of soldering or brazing material are manually placed into each chamber between the blades, and the rotor is subsequently heated-up. This prior art method has the disadvantage that the emplacement of the small rods is time-consuming and that it cannot be avoided thereby that more small rods are installed into individual chambers than necessary whereby the consumption in soldering or brazing material increases and the rotor is likely to receive an imbalance, i.e., an out-of-balance condition.

The present invention is concerned with providing a method for soldering-in or brazing-in the blades which avoids the aforementioned disadvantages.

The underlying problems are solved according to the present invention in that the blades are fixed in the predetermined position, two wires made from soldering or brazing material and bent in the form of rings having the inner or outer diameters of the blades are placed upon the ends of the latter, and the rotor, together with the ring-shaped wires, are heated, possibly in a protective gaseous atmosphere, to a temperature that is higher than the melting temperature of the soldering or brazing material and are subsequently cooled.

Not only working time is economized by the use of the method according to the present invention and the soldering or brazing material is distributed uniformly over the circumference but also the soldering or brazing material may, in contradistinction to the known, prior art method, flow from the top toward the bottom in a generally downward direction so that it reaches more easily the soldering places at the individual blades than if it has to flow along the blade ends from the bottom toward the top in a generally upward direction.

In an advantageous type of construction of the present invention with hydrodynamic units such as torque converters, couplings and brakes, provided with an annular shell or dish inserted into the blades, two wires made from soldering material and bent into the shape of a ring are additionally placed on the blades at the abutment or joint places between the blades and the annular dish. A soldering or brazing of the blades with the annular dish is only made possible by such a method because, according to the known method, the soldering material cannot reach up to the joint or abutment places above the height of the blades.

Accordingly, it is an object of the present invention to provide a method for fixing by soldering or brazing the blades of a rotor for a hydrodynamic unit which avoids by simple means the shortcomings and disadvantages encountered heretofore.

Another object of the present invention resides in a method for soldering the blades of a rotor for hydrodynamic units which reduces the time necessary for the assembly and results in a more economic operation.

A further object of the present invention resides in a method for fixing the blades of a rotor for a hydrodynamic unit which avoids the possibility of imbalances in the rotor as a result of non-uniform distribution of the soldering or brazing material.

Still another object of the present invention resides in a method of the type described above which produces a superior joint between the blades and the blade housing.

These and further objects, features, and advantages of the present invention will become more obvious from the following description when taken in connection with the accompanying drawing which shows, for purposes of illustration only, one embodiment in accordance with the present invention, and wherein:

The single FIGURE is a cross-sectional view through the turbine wheel of a hydrodynamic torque converter with four wires made from soldering or brazing material and bent in the form of a ring which are placed on the blades.

Referring now to the single FIGURE of the drawing, reference numeral 1 designates therein a conventional shell or dish which is connected by way of a hub body 2 with a drive shaft (not shown) disposed concentrically to the center longitudinal axis 3 of the turbine wheel. Curved blades 4 matched to the shape of the dish 1 are inserted into the shell or dish 1. An annular shell or dish 5 is inserted into the indentation of the blades 4. The turbine wheel described so far is known as such and forms no part of the present invention.

After the blades 4 are fixed in the predetermined position, for example, by means of two blade bands provided with slots, four annularly bent wires 6a, 6b, 6c and 6d made from soldering material are placed over the blades 4. The annularly bent wires 6a and 6b thereby abut at the dish or shell 1 whereas the annularly bent wires 6c and 6d abut at the annular shell 5. During the subsequent heating of the turbine wheel above the melting temperature of the soldering or brazing material, possibly in a protected gaseous atmosphere of conventional type, the soldering material stemming from the annularly bent wires 6a and 6b flows into the very narrow gaps between the blades 4 and the dish or shell 1 while correspondingly, the soldering material of the bent wires 6c and 6d flows into the gaps between the blades 4 and the annular shell or dish 5. The annular shell or dish 5 may thereby be loaded or weighted by means of a ring. This ring (not shown) has the task that the annular dish or shell 5 made from corresponding thin sheet metal adapts itself completely to the indentation of the blades 4 under the load and the soldering or brazing temperature, i.e., a slight plastic deformation takes place which makes very small the gap between the annular dish 5 and the blades 4. The shape of this loading or weighting ring should be roof-shaped in order to achieve as large as possible a radiation surface during the cooling operation and to achieve thereby a uniform cooling. After the cooling of the turbine wheel, the blades 4 are soldered or brazed to the shell or dish 1 and to the annular shell or dish 5. In contradistinction thereto, a soldering-in or brazing-in of the blades 4 in the described turbine wheel is not possible according to the prior art method since the soldering material from the small rods which after assembly rest on the dish or shell 1, cannot rise above the blades 4 up to the annular dish or shell 5.

Reference is made in the specification and claims to "soldering" and "brazing" as regards the useful applicability of the present invention, however, it is understood that "brazing" represents the more important preferred solution as regards applicability of this invention, especially in connection with the rapidly rotating hydrodynamic units utilized in the automotive field.

While I have shown and described only one embodiment in accordance with the present invention, it is understood that the same is not limited thereto but is susceptible of numerous changes and modifications, as known to those skilled in the art, and I therefore do not wish to be limited to the details shown and described herein but intend to cover all such changes and modifications as are encompassed by the scope of the appended claims.

I claim:

1. A method for soldering or brazing blades of a rotor for a hydrodynamic unit, characterized by the steps of fixing the blades in a predetermined position within an annular blade housing to form a ring of radially extending blades in which the inner and outer radial extent of the blades are placed immediately adjacent corresponding inner and outer portions of the annular blade housing, placing two wires made from soldering or brazing material and which are bent into annular shapes having diameters corresponding to the inner and outer radial extent of the blades on the ends of the blades, thereafter heating the thus-assembled unit to a higher temperature than the melting temperature of the soldering or brazing material such that the material flows downwardly by gravity along the blade periphery into the gaps between the blade and the housing for joining the blades to the housing, and finally cooling the previously heated unit.

2. A method according to claim 1, characterized in that the heating takes place in a protective gas atmosphere.

3. A method according to claim 1, for hydrodynamic units such as torque converters, couplings and brakes having an annular dish inserted into corresponding indentations in the blades, characterized in that additionally two wires made from soldering or brazing material and bent into the shape of rings are placed on the blades at the joint places between the blades and the annular dish such that upon heating of the unit the material flows downwardly by gravity along the blade into the gaps between the blades and the dish for joining the blades to the dish.

4. A method according to claim 3, characterized in that the heating takes place in a protective gas atmosphere.

* * * * *